United States Patent [19]

Culbertson

[11] Patent Number: 5,460,421
[45] Date of Patent: Oct. 24, 1995

[54] ACTIVE IMPACT COLUMN

[75] Inventor: Timothy J. Culbertson, Waterford, Mich.

[73] Assignee: Chrysler Corporation, Highland Park, Mich.

[21] Appl. No.: 251,157

[22] Filed: May 31, 1994

[51] Int. Cl.$^6$ ............................................. B60R 19/18
[52] U.S. Cl. ................................... 293/133; 188/377
[58] Field of Search ........................... 293/132, 133, 293/134, 135, 4, 9, 10, 153, 102; 188/376, 377; 280/777, 780

[56] References Cited

U.S. PATENT DOCUMENTS

| | | | |
|---|---|---|---|
| 3,355,208 | 11/1967 | Brock | 293/9 |
| 3,759,351 | 9/1973 | Purple | 293/135 X |
| 3,789,948 | 2/1974 | Hrebicek | 180/91 |
| 3,848,914 | 11/1974 | Wathen | 293/9 |
| 3,992,047 | 11/1976 | Barenyi et al. | 293/9 |
| 4,566,555 | 1/1986 | Schlanger | 293/132 X |
| 4,823,923 | 4/1989 | Moyer | 188/376 |
| 5,011,205 | 4/1991 | Lin | 293/5 |
| 5,033,593 | 7/1991 | Kazuhito | 188/377 |
| 5,285,877 | 2/1994 | Bonenberger et al. | 293/134 X |

*Primary Examiner*—David M. Mitchell
*Assistant Examiner*—Kia M. Robinson
*Attorney, Agent, or Firm*—Margaret A. Dobrowitsky

[57] ABSTRACT

A dual resistance cylinder responsive to the energies present in low speed collisions to return the bumper without damage and responsive to the energies present in high speed collisions to offer greater protection to the vehicle passengers. The cylinder employs members having telescoping side walls which offer a first (low) resistance against compression and, when locked together, offer a second (high) resistance against compression. The side walls are locked together by way of an electronic solenoid.

5 Claims, 1 Drawing Sheet

U.S. Patent  Oct. 24, 1995  5,460,421
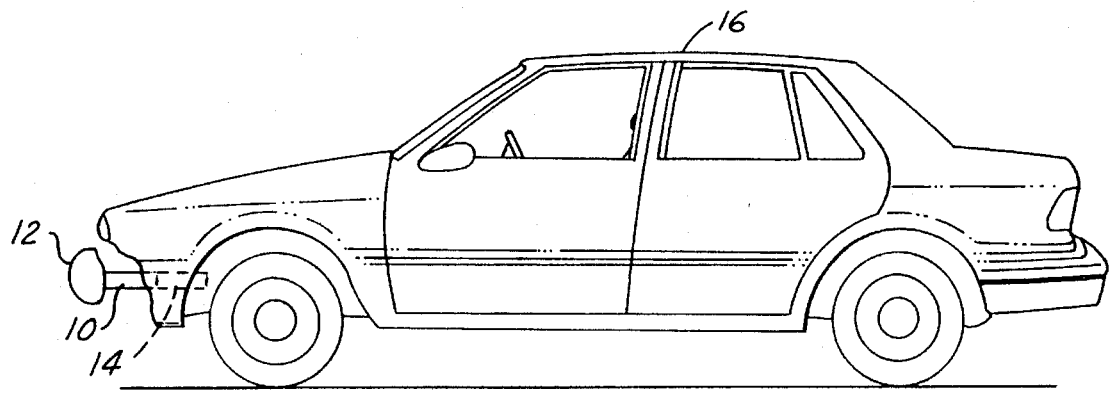
FIG. 1
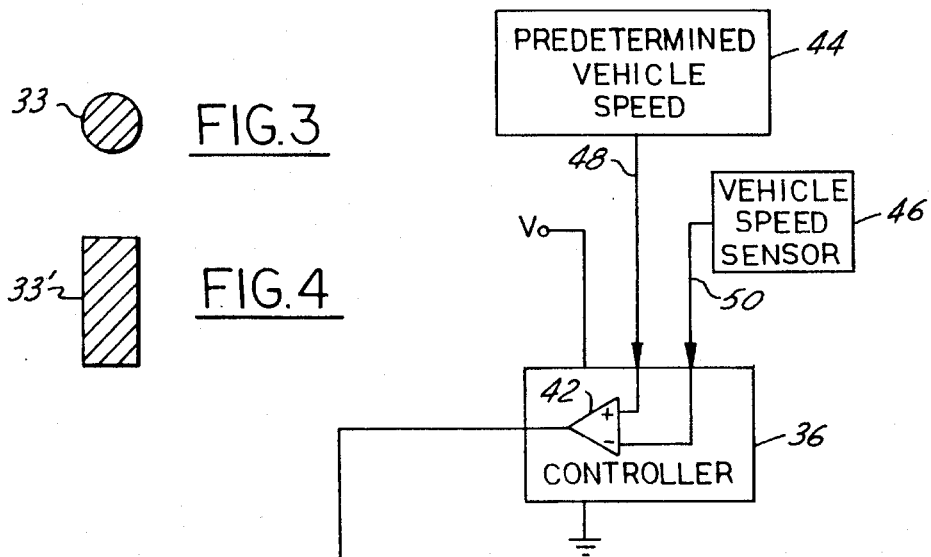
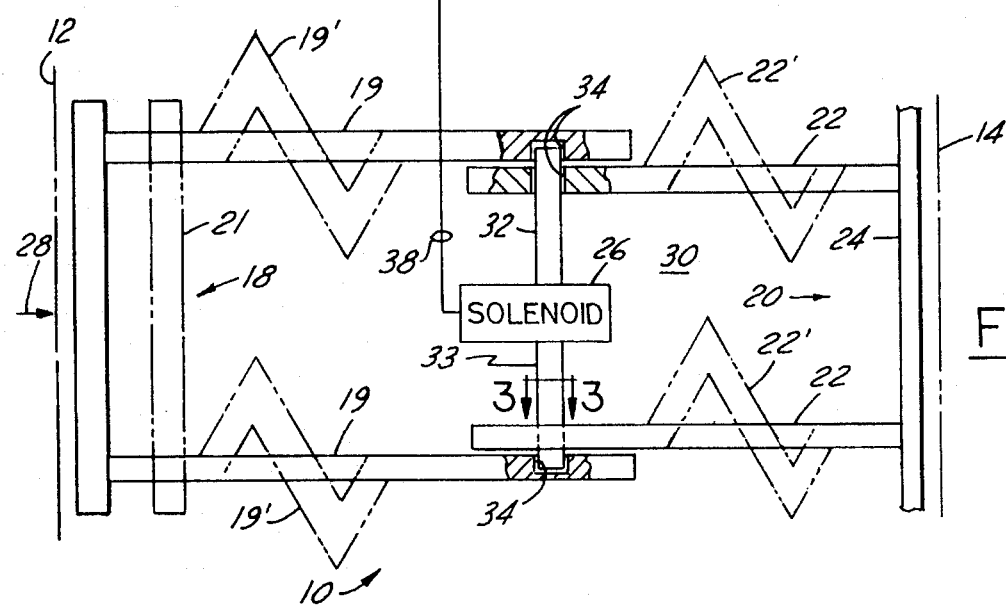

5,460,421

ACTIVE IMPACT COLUMN

TECHNICAL FIELD

The present invention relates to collapsible cylinders, and more particularly relates to cylinders that can be selected to present one of two possible resistances in opposition against compressive loads.

BACKGROUND OF THE INVENTION

It is desirable to design the front bumper portion of a car so that when it is struck it "gives way" and then returns without damage. These types of bumpers are commonly known as shock absorbing bumpers. Currently in the United States, there exists Federally established minimum speed standards for shock absorbing bumpers. However, during a high speed impact, shock absorbing bumpers do little to dissipate the massive amounts of energy present. Thus, bumpers designed to absorb compressive forces during low speed impacts are ineffective to absorb the energy present during a high speed impact. Furthermore, with late model designs employing small engine compartments, crush space is decreasing making the energy absorbing capacity of the shock absorbing bumper even more critical.

There have been attempts to design a shock absorbing bumper that has an adjustable energy absorbing feature. For example, U.S. Pat. Nos. 5,011,205; 3,992,047; 3,848,914; 3,789,948; and 3,355,208 all employ the use of fluid filled cylinders for controlling the compression resistance of a vehicle bumper cylinder. While these devices are undoubtedly operative in accomplishing their objectives, they are expensive to produce, complicated in operation, and not compact.

Therefore, it is the object of the present invention to provide a cylinder having a variable compression resistance which is inexpensive to manufacture, simple in operation, and compact.

SUMMARY OF THE INVENTION

In light of foregoing objects, the present invention provides a variable compression resistant cylinder including first and second cylinders, each said cylinder including side walls, the side walls of the first cylinder adapted to be telescopically received by the side walls of the second cylinder, an electric solenoid having an output plunger, wherein the side walls of the first and second cylinders include aligned apertures and the output plunger is adapted to pass through the apertures upon actuation of the electric solenoid.

The materials of the plunger and the materials of the side walls of the cylinders are selected such that during a high speed collision, the side walls of the cylinders collapse in an accordion fashion and the strength characteristics of the plunger are such that it is not sheared by the shear forces of the telescoping cylinder walls.

Other advantages and meritorious features of the present invention will become more fully understood from the following description of the preferred embodiments, the appended claims, and the drawings, a brief description of which follows.

BRIEF DESCRIPTION OF THE DRAWINGS

FIG. 1 is a diagramatic drawing of an automobile employing the compression resistant cylinder of the present invention.

FIG. 2 is a diagrammatic representation of the compression resistant cylinder of the present invention.

FIG. 3 is a cross sectional view of plunger 33 taken substantially through lines 3—3 of FIG. 2.

FIG. 4 is a cross sectional view of an alternative embodiment of plunger 33.

DETAILED DESCRIPTION OF THE PREFERRED EMBODIMENTS

Now referring to FIG. 1, compression resistant cylinder 10 is positioned between bumper 12 and frame 14 and serves to fasten bumper 12 to frame 14.

Now referring to FIG. 2, compression resistant cylinder 10 is comprised of first telescoping cylinder 18 and second telescoping cylinder 20. First telescoping cylinder 18 includes side walls 19 and end wall 21. Second telescoping cylinder 20 includes side walls 22 and end wall 24. End wall 21 is adapted to be fastened to bumper 12 and end wall 24 is adapted to be fastened to frame 14.

Side walls 19, 22 of telescoping cylinders 18, 20, respectively, are adapted to telescopically engage one another when compressive force 28 is placed on bumper 12. For compression energies which are present during low speed collisions, the compression resistance of cylinder 10 can be controlled by any number of well known techniques. One such technique includes allowing a liquid (captivated within chamber 30) to slowly escape therefrom. Another technique would include placing a compression spring within chamber 30 such that one end of the spring abuts end wall 21 and the opposite end of the spring abuts end wall 24. Of course, in some applications it may be desirable to have cylinder 10 offer little or no resistance during a low speed collision. In such instances, chamber 30 would simply be open to atmosphere without any spring or the like residing within chamber 30.

Solenoid 26 resides within chamber 30 and has at least one plunger 32. Preferably, solenoid 26 is fashioned with a second plunger 33.

Side walls 19, 22 are fashioned with aligned apertures 34. When solenoid 26 is in the first of its two operational states, preferably its non-excited state, the plungers are retracted from apertures 34 and walls 19 will move past walls 22 in the way that has already been described. When solenoid 26 is in its second operational state, preferably its excited state, plungers 32, 33 are extended outwardly and engage apertures 34. In this state, side walls 19 are not free to move past side walls 22 and if large forces 28 are present on bumper 12, the side walls 19, 22 of cylinder 10 will collapse in an accordion fashion 19', 22' thereby offering a greater compression resistance than that offered when plungers 32, 33 are retracted.

In order to maximize the energy absorbing capability of cylinder 10, it is desirable to have side walls 19, 22 crush in an accordion-style fashion. Thus, when selecting the materials used for side walls 19, 22 and plungers 32, 33 it is important that this accordion action occur before plungers 32, 33 themselves shear or shear into side walls 19, 22. This design feature can be guaranteed by proper selection of materials used in constructing side walls 19, 22 and plungers 32, and 33 and also controlling the thicknesses and geometry of such materials. FIG. 3 shows the cross sectional view of plunger 33. FIG. 4 shows a cross sectional view of plunger 33' which is an alternative embodiment of plunger 33. Plunger 33' may be preferred to plunger 33 in those applications where shearing of side walls 19, 22 by plunger 33 is a problem.

Solenoid 26 is connected to vehicle controller 36 by way of conductor 38. Vehicle controller 36 can be any number of electronic controllers well known to those skilled in the art of automobile controls. Vehicle controller 36 can be as simple as an analogue comparator 42 which compares predetermined vehicle speed 44 with actual vehicle speed 46. Predetermined vehicle speed 44 can be a voltage type signal generated from any number of locations, one of which can simply be a predetermined voltage setting. Such comparison can also be accomplished digitally (using discrete component or a microprocessor). Vehicle speed sensor 46 can be any number of types of well known vehicle speed sensor such as those used in conjunction with a vehicle wheel to sense vehicle speed, or those used in conjunction with a vehicle transmission to detect vehicle speed.

METHOD OF OPERATION

Predetermined vehicle speed input 44 provides a signal along line 48 which is indicative of the vehicle speed for which it is desired to extend plungers 32, 33 of solenoid 26 into apertures 34. Vehicle speed sensor 46 is responsive to actual vehicle speed and outputs an electronic signal representative of actual vehicle speed along line 50. Controller 36 is responsive to both predetermined vehicle speed 44 and actual vehicle speed 46 wherein when actual vehicle speed 46 exceeds predetermined vehicle speed 44, controller 36 outputs a signal along line 38 and solenoid 26 is responsive to that signal to extend plungers 32, 33 into apertures 34. In this manner, cylinder 10 operates as a dual resistance cylinder. One mode of resistance is established when plungers 32, 33 are not present within aperture 34 and the second mode of resistance is established when plungers 32, 34 are present in apertures 34.

The foregoing detailed description shows that the preferred embodiments of the present invention are well suited to fulfill the objects of the invention. It is recognized that those skilled in the art may make various modifications or additions to the preferred embodiments chosen here to illustrate the present invention without departing from the spirit of the present invention. For example the movement of plunger 32 is accomplished in the present invention by way of electric solenoid 26; however other actuators can be used to activate plunger 32 such as those employing mechanical linkages, hydraulics, etc. Accordingly, it is to be understood that the subject matter sought to be affected protection hereby should be deemed to extend to the subject matter defined in the appended claims, including all fair equivalents thereof.

I claim:

1. An apparatus having a variable crush resistance, comprising:

first and second cylinders, each said cylinder including side walls, said side walls of said first cylinder adapted to be telescopically engaged by said side walls of said second cylinder, an electric solenoid having an output plunger, wherein said side walls of said first and second cylinders include aligned apertures and said output plunger is adapted to pass through said apertures upon actuation of said electric solenoid.

2. A variable crush resistance cylinder for the bumper of a vehicle, comprising:

means for sensing actual vehicle speed, means coupled to said sensing means for outputting a signal, when said actual vehicle speed exceeds a predetermined vehicle speed, a first and a second cylindrical member, each said member having side walls extending from an end portion, said side walls of said first cylindrical member adapted to be telescopically engaged by said side walls of said second cylindrical member, said side walls of said first and second cylindrical members each including aligned bores, means coupled to said outputting means for prohibiting telescoping action between said first and second cylindrical members.

3. The cylinder of claim 2, wherein said first cylindrical member and second cylindrical member includes an aperture, and wherein said apertures are aligned.

4. The cylinder of claim 3, wherein said prohibiting means includes an electric solenoid having an output plunger wherein said plunger is adapted to pass into said aligned apertures.

5. The cylinder of claim 4, wherein said plunger and said cylinder side walls are selected from materials such that when said cylinder is put under compressive loading, said side walls collapse in accordion fashion before said plunger shears.

* * * * *